(12) United States Patent
Subramanya et al.

(10) Patent No.: US 10,889,484 B2
(45) Date of Patent: Jan. 12, 2021

(54) SYSTEM AND METHOD FOR SENSING A LIQUID LEVEL IN AN AUTOFILL PITCHER USING VIBRATIONS

(71) Applicant: Haier US Appliance Solutions, Inc., Wilmington, DE (US)

(72) Inventors: Praveena Alangar Subramanya, Karnataka (IN); Sharath Chandra, Hyderabad (IN); Andrew Reinhard Krause, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 17 days.

(21) Appl. No.: 16/247,656

(22) Filed: Jan. 15, 2019

(65) Prior Publication Data
US 2020/0223683 A1 Jul. 16, 2020

(51) Int. Cl.
*B67D 1/12* (2006.01)
*G01F 23/296* (2006.01)
(Continued)

(52) U.S. Cl.
CPC ......... *B67D 1/1238* (2013.01); *B67D 1/0871* (2013.01); *B67D 3/0003* (2013.01);
(Continued)

(58) Field of Classification Search
CPC .... B67D 1/1238; B67D 1/0871; B67D 3/003; B67D 2001/1259; B67D 2001/1261;
(Continued)

(56) References Cited

U.S. PATENT DOCUMENTS 5,819,547 A * 10/1998 Oh ....................... B67D 3/0009
62/188
6,681,585 B1 1/2004 Stagg et al.
(Continued)

FOREIGN PATENT DOCUMENTS

CN 204514468 U 7/2015
FR 3063423 A1 * 9/2018 ........... B67D 1/1272

OTHER PUBLICATIONS

Damped and Driven Oscillations, Lumen Learning, Nov. 10, 2017 [retrieved on Jul. 28, 2020. Retrieved from the Internet URL: https://web.archive.org/web/20171110103734/https://courses.lumenlearning.com/boundless-physics/chapter/damped-and-driven-oscillations/] (Year: 2017).*

(Continued)

*Primary Examiner* — Mary E McManmon
*Assistant Examiner* — Stephanie A Shrieves
(74) *Attorney, Agent, or Firm* — Dority & Manning, P.A.

(57) ABSTRACT

A refrigerator appliance having a dispensing system and a method for dispensing liquid into a container are provided. The dispensing system can be an autofill dispensing system. In one example aspect, the dispensing system includes a vibration generator and a measurement device. When a container is present in a preselected position, liquid is delivered to the container. As liquid fills into the container, the vibration generator propagates vibrations through the container. The measurement device detects one or more characteristics of the vibration and routes one more signals indicative of the characteristics to a controller of the system. The controller determines a liquid fill level of liquid within the container based at least in part on the signals received from the measurement device.

20 Claims, 8 Drawing Sheets

(51) Int. Cl.
*F25D 23/12* (2006.01)
*B67D 1/08* (2006.01)
*B67D 3/00* (2006.01)
*F25D 23/04* (2006.01)

(52) U.S. Cl.
CPC .......... *F25D 23/04* (2013.01); *F25D 23/126* (2013.01); *G01F 23/2962* (2013.01); *F25D 2331/81* (2013.01)

(58) Field of Classification Search
CPC ... B67D 7/46; B67D 3/00; B67D 1/08; B67D 1/12; B67D 1/124; B67D 1/0014; B67D 1/0888; F25D 23/126; F25D 23/04; F25D 2331/81; F25D 23/12; G01F 23/2962; G01F 23/296; G01F 23/2965; F25C 5/22; B65B 1/22
USPC ................................ 141/74, 95, 198; 62/389
See application file for complete search history.

(56) References Cited

U.S. PATENT DOCUMENTS

| | | |
|---|---|---|
| 6,789,585 B1 | 9/2004 | Janke |
| 7,658,212 B2 | 2/2010 | Meuleners et al. |
| 7,743,801 B2 * | 6/2010 | Janardhanam ........ F25D 23/126 141/351 |
| 9,085,453 B2 | 7/2015 | McMahan et al. |
| 9,395,232 B2 * | 7/2016 | Crosby ............... G01F 23/2962 |
| 9,663,343 B2 | 5/2017 | Veldhi et al. |
| 2005/0178273 A1 * | 8/2005 | Meuleners ........... B67D 1/0858 99/279 |
| 2008/0083475 A1 * | 4/2008 | Lamb .................. B67D 1/0871 141/198 |
| 2008/0216504 A1 * | 9/2008 | Kim ..................... B67D 1/0005 62/338 |
| 2010/0175783 A1 * | 7/2010 | Kim ..................... F25D 23/126 141/198 |
| 2013/0133355 A1 * | 5/2013 | Park ..................... F25D 23/126 62/340 |
| 2013/0146179 A1 * | 6/2013 | McMahan .............. B67D 7/221 141/83 |
| 2017/0052054 A1 * | 2/2017 | Merker .................. G01S 7/521 |
| 2017/0137277 A1 * | 5/2017 | Comsa .................. B67D 7/005 |
| 2018/0187964 A1 * | 7/2018 | Park ..................... F25D 23/028 |

OTHER PUBLICATIONS

FR-3063423-A1 English Translation of Specification (Year: 2020).*

* cited by examiner

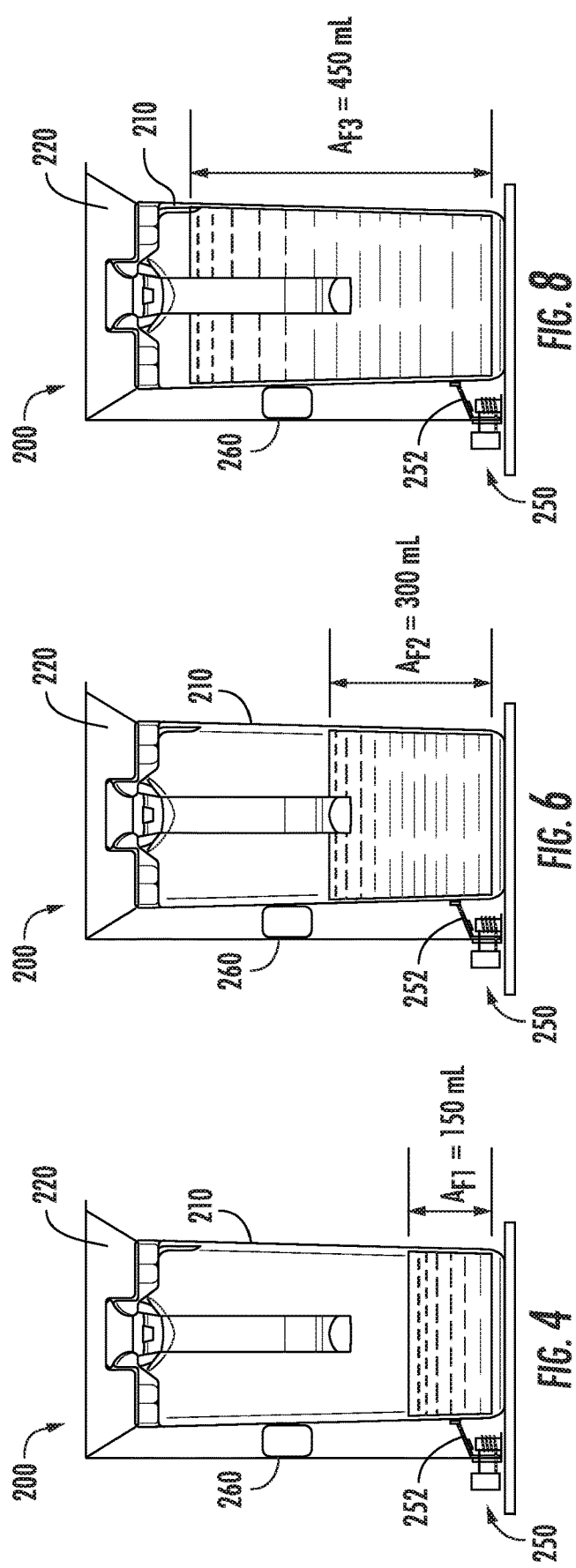
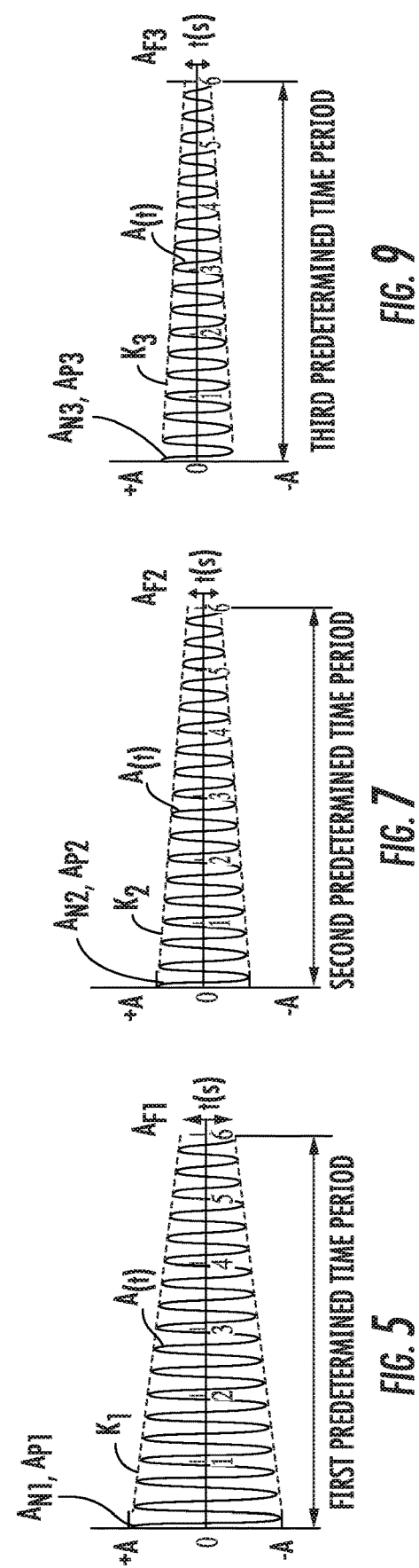

SYSTEM AND METHOD FOR SENSING A LIQUID LEVEL IN AN AUTOFILL PITCHER USING VIBRATIONS

FIELD OF THE INVENTION

The present subject matter relates generally to refrigerator appliances, and more particularly to autofill dispensing systems for refrigerator appliances.

BACKGROUND OF THE INVENTION

Some refrigerator appliances include autofill dispensing systems. Autofill dispensing systems typically include a dispensing housing and an autofill pitcher. When the autofill pitcher is positioned in a designated spot, e.g., beneath the autofill housing, water or another liquid is automatically dispensed into the autofill pitcher. Some autofill pitchers include a float mechanism positioned within a housing of the autofill pitcher that moves upward with the rising liquid in the autofill pitcher. When the liquid within the autofill pitcher has reached a designated fill level, the float mechanism triggers the system to cease dispensing liquid. While such float mechanisms are capable of triggering the system when the fill level is reached, the housing and float mechanism occupy a considerable amount of space in the autofill pitcher. Thus, autofill pitchers have conventionally been limited in their liquid storage capacity. Moreover, such systems are only capable of determining when the fill level has been reached, and not configured to determine the liquid level of the liquid within the autofill pitcher at other liquid levels. In addition, changing the desired fill level has either not been an option or has required physical manipulation of the system. Some other dispensing systems have included other types of sensing devices for detecting the liquid fill level. However, the sensing devices of such systems have typically been expensive.

Accordingly, an autofill dispensing system and methods thereof that addresses one or more of the challenges noted above would be desirable.

BRIEF DESCRIPTION OF THE INVENTION

Aspects and advantages of the invention will be set forth in part in the following description, or may be apparent from the description, or may be learned through practice of the invention.

In one exemplary embodiment, a refrigerator appliance is provided. The refrigerator appliance includes a cabinet defining a chilled chamber. The refrigerator appliance also includes a dispensing system positioned within the chilled chamber. The dispensing system includes a vibration generator operable to propagate one or more vibrations through a container operable to contain liquid. Further, the refrigerator appliance includes a measurement device operable to measure a characteristic of the one or more vibrations propagating through the container. Moreover, the refrigerator appliance includes a controller communicatively coupled with the vibration generator and the measurement device. The controller is configured to receive, from the measurement device, one or more signals indicative of the characteristic of the one or more vibrations propagating through the container. In addition, the controller is configured to determine a liquid level of liquid within the container based at least in part on the one or more signals indicative of the characteristic of the one or more vibrations propagating through the container.

In another exemplary embodiment, a dispensing system for an appliance is provided. The dispensing system includes a spout for dispensing liquid into a container present in a preselected position. The dispensing system also includes a supply conduit fluidly connecting a liquid supply with the spout. Further, the dispensing system includes a valve positioned along the supply conduit and movable between an open position and a closed position, the valve operable to selectively allow liquid to flow from the liquid supply to the spout. Moreover, the dispensing system includes a vibration generator operable to propagate one or more vibrations through the container present in the preselected position. The dispensing system also includes a measurement device operable to measure a characteristic of the one or more vibrations propagating through the container. Further, the dispensing system includes a controller communicatively coupled with the valve, the vibration generator, and the measurement device, the controller configured to: command, if the container is present in the preselected position, the valve to move to the open position to allow liquid to flow from the liquid supply to the spout so that liquid can flow into the container; activate the vibration generator to propagate the one or more vibrations through the container; receive, from the measurement device, one or more signals indicative of the characteristic of the one or more vibrations propagating through the container; and determine a liquid level of liquid within the container based at least in part on the one or more signals indicative of the characteristic of the one or more vibrations propagating through the container.

In yet another exemplary embodiment, a method for dispensing liquid into a container is provided. The method includes flowing liquid into the container. The method also includes propagating, by a vibration generator, one or more vibrations through the container at predetermined intervals. Further, the method includes measuring, via a measurement device, a characteristic of the one or more vibrations propagating through the container at the predetermined intervals. The method also includes receiving, by a controller, one or more signals indicative of the characteristic of the one or more vibrations propagating through the container at the predetermined intervals. In addition, the method includes determining, by the controller, a liquid level of liquid within the container based at least in part on the one or more signals indicative of the characteristic of the one or more vibrations propagating through the container at the predetermined intervals.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 4 provides a schematic view of a container of the dispensing system of FIG. 3 filled with liquid to a first liquid level;

FIG. 5 provides a chart depicting a vibration signal propagating through the container filled to the first liquid level as shown in FIG. 4;

FIG. 6 provides a schematic view of the container of the dispensing system of FIG. 3 filled with liquid to a second liquid level;

FIG. 7 provides a chart depicting a vibration signal propagating through the container filled to the second liquid level as shown in FIG. 7;

FIG. 8 provides a schematic view of the container of the dispensing system of FIG. 3 filled with liquid to a third liquid level;

FIG. 9 provides a chart depicting a vibration signal propagating through the container filled to the third liquid level as shown in FIG. 8;

DETAILED DESCRIPTION

Figure 1:
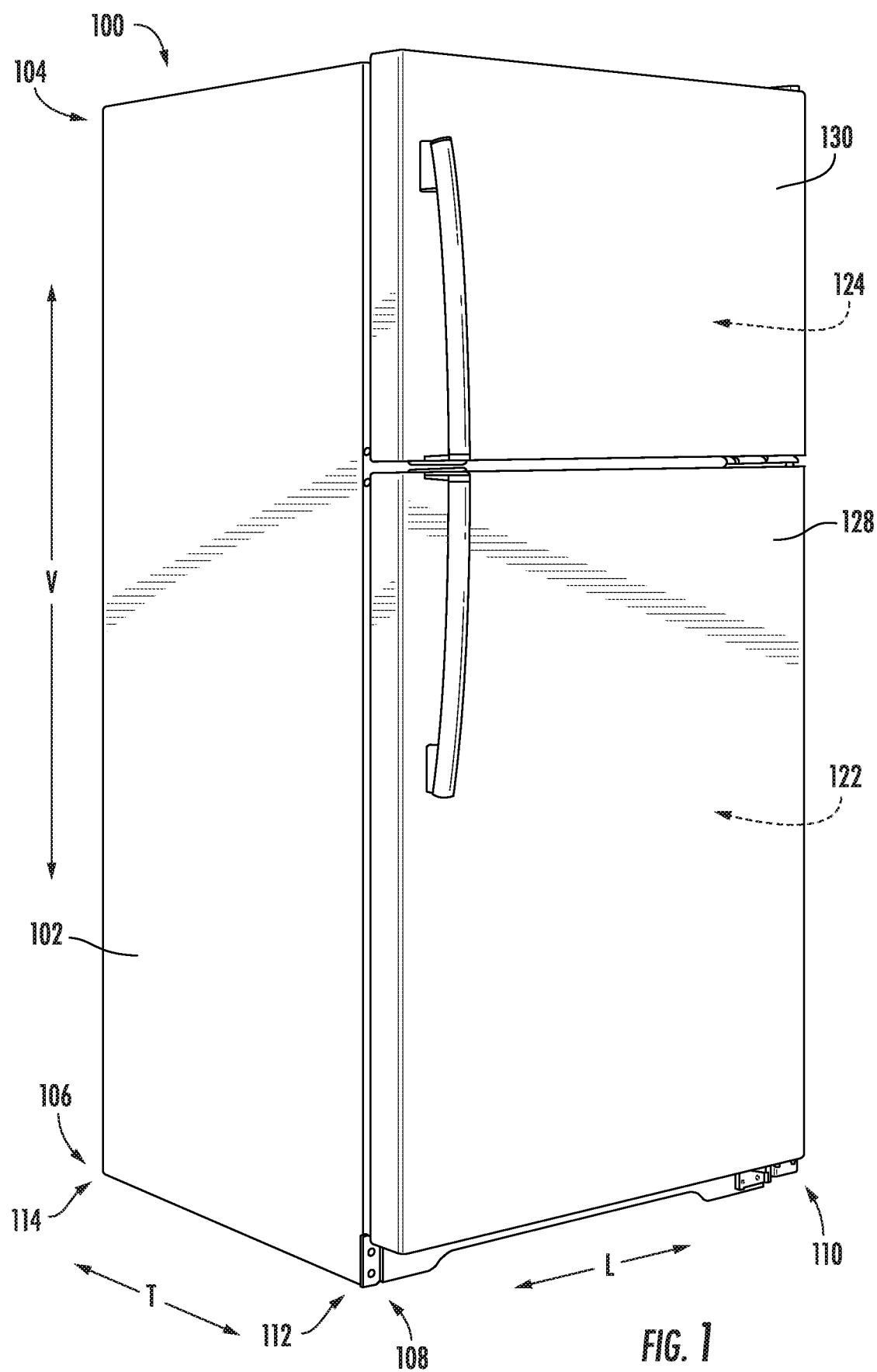
FIG. 1 provides a front perspective view of an example refrigerator appliance according to an example embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents. As used herein, terms of approximation, such as "approximately," "substantially," or "about," refer to being within a ten percent (10%) margin of error of the stated value. Moreover, as used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

FIG. 1 provides a front perspective view of a refrigerator appliance 100 according to an exemplary embodiment of the present subject matter. For this embodiment, refrigerator appliance 100 is depicted as a "top freezer" refrigerator appliance. However, the inventive aspects of the present disclosure apply to other types and styles of refrigerator appliances, such as e.g., bottom mount refrigerator appliances, side-by-side refrigerator appliances, built-in or column refrigerator appliances, etc. Consequently, the description set forth herein is for illustrative purposes only and is not intended to be limiting in any aspect to any particular refrigerator appliance type or configuration. Moreover, the inventive aspects of the present disclosure can also apply or be incorporated in other appliances as well. For instance, the liquid level sensing systems and methods described herein can be employed in water heaters, coffee makers, washing machines, etc.

Refrigerator appliance 100 includes a cabinet or housing 102 that extends between a top 104 and a bottom 106 along a vertical direction V, between a first side 108 and a second side 110 along a lateral direction L, and between a front side 112 and a rear side 114 along a transverse direction T. Each of the vertical direction V, lateral direction L, and transverse direction T are mutually perpendicular to one another and form an orthogonal direction system.

Housing 102 defines chilled chambers for receipt of food items for storage. In particular, housing 102 defines a fresh food chamber 122 and a freezer chamber 124. Freezer chamber 124 is positioned at or adjacent top 104 of cabinet 102 and fresh food chamber 122 is arranged at or adjacent bottom 106 of cabinet 102 along the vertical direction V. Thus, as noted above, refrigerator appliance 100 is a "top freezer" refrigerator appliance in the depicted embodiment. A refrigerator door 128 is rotatably mounted to an edge of housing 102 for selectively accessing fresh food chamber 122. Similarly, a freezer door 130 is rotatably mounted to an edge of housing 102 for selectively accessing freezer chamber 124. Refrigerator door 128 and freezer door 130 are shown in the closed configuration in FIG. 1. One skilled in the art will appreciate that other chamber and door configurations are possible and within the scope of the present invention.

Figure 2:
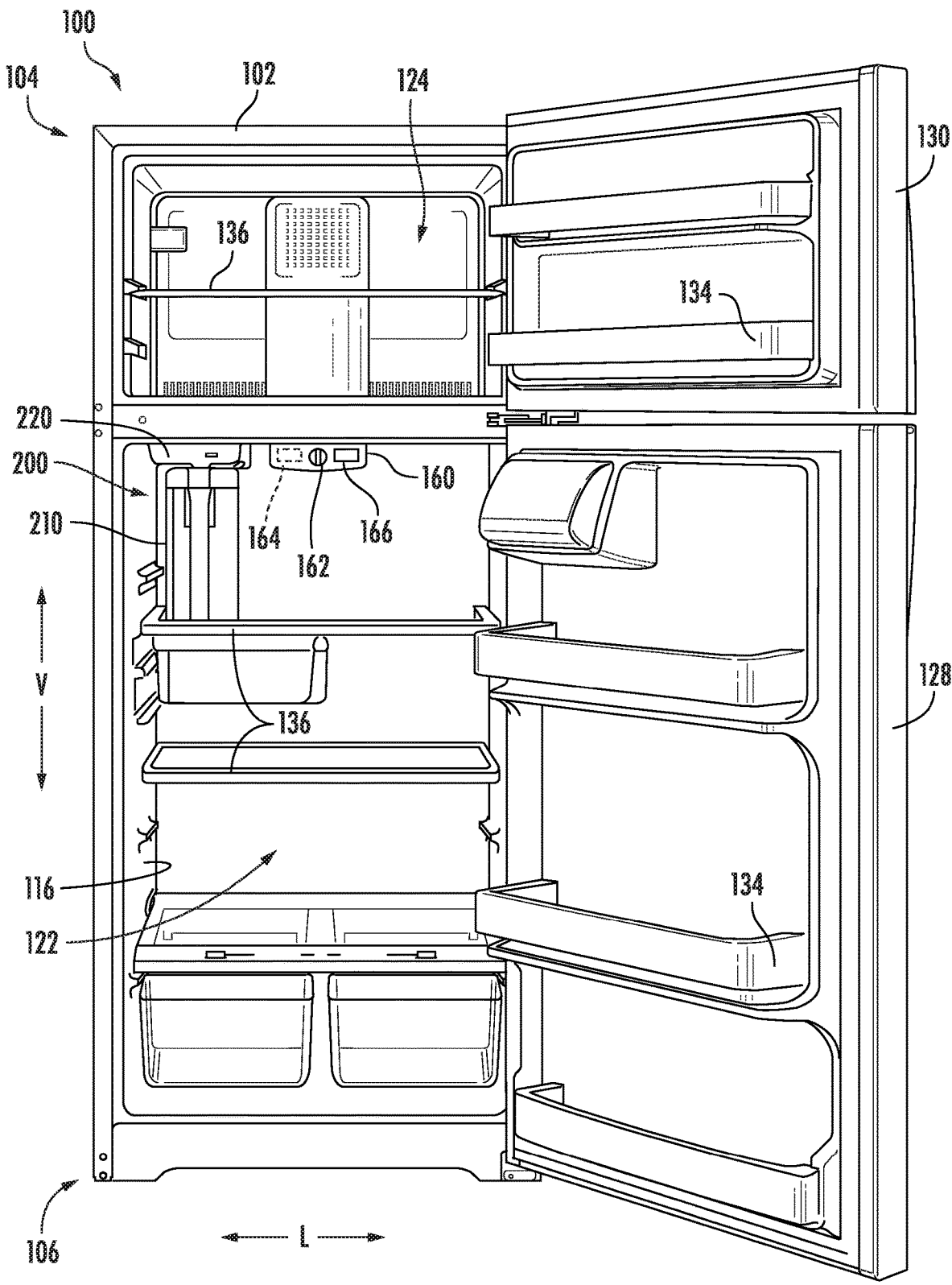
FIG. 2 provides a front view of the refrigerator appliance of FIG. 1 and depicts a refrigerator door and a freezer door of the refrigerator appliance in an open position.

FIG. 2 provides a front view of refrigerator appliance 100 shown with refrigerator door 128 and freezer door 130 in the open position. As shown in FIG. 2, cabinet 102 includes a liner 116 having a plurality of walls that thermally insulate the chilled chambers. Furthermore, various storage components are mounted within fresh food chamber 122 and freezer chamber 124, e.g., to liner 116, to facilitate storage of food items therein as will be understood by those skilled in the art. In particular, the storage components may include bins 134 and shelves 136. Each of these storage components are configured for receipt of food items (e.g., beverages and/or solid food items) and may assist with organizing such food items. As illustrated, bins 134 can be mounted on refrigerator door 128 and freezer door 130 or may slide into a receiving space in fresh food chamber 122 and/or freezer chamber 124. One or more shelves 136 can be mounted within fresh food chamber 122 and/or freezer chamber 124. It should be appreciated that the illustrated storage components are used only for the purpose of explanation and that other storage components may be used and may have different sizes, shapes, and configurations.

Refrigerator appliance 100 includes a control panel 160. Control panel 160 includes one or more input selectors 162, such as e.g., knobs, buttons, push buttons, touchscreen interfaces, etc. In addition, input selectors 162 may be used to specify or set various settings of refrigerator appliance 100, such as e.g., settings associated with a dispensing system as will be explained further below. Input selectors 162 may be in communication with a processing device or controller 164. Control signals generated in or by controller 164 operate refrigerator appliance 100 in response to input selectors 162. Additionally, control panel 160 can include a display device 166. Display device 166 is communicatively coupled with controller 164 and can display information, e.g., prompts or items to select in response to commands from controller 164. Further, as will be described herein, controller 164 can be communicatively coupled with other components of refrigerator appliance 100, such as e.g., one or more sensors and components of a dispensing system.

As used herein, "processing device" or "controller" may refer to one or more microprocessors or semiconductor devices and is not restricted necessarily to a single element. The processing device can be programmed to operate refrigerator appliance 100. The processing device may include, or be associated with, one or more memory elements (e.g., non-transitory storage media). In some such embodiments, the memory elements include electrically erasable, programmable read only memory (EEPROM). Generally, the memory elements can store information accessible processing device, including instructions that can be executed by processing device. Optionally, the instructions can be software or any set of instructions and/or data that when executed by the processing device, cause the processing device to perform operations.

Refrigerator appliance 100 includes a dispensing system 200 disposed within fresh food chamber 122. Generally, dispensing system 200 includes features for dispensing liquid into a container 210 operable to hold or contain liquid when container 210 is positioned or present in a preselected position, e.g., beneath a dispenser housing 220 along the vertical direction V. Although the preselected position is shown beneath dispenser housing 220 is the depicted embodiment of FIG. 2, the preselected position can be other suitable locations within fresh food chamber 122 or in other suitable locations, such as e.g., within a recess defined on the exterior or interior of one of doors 128, 130.

For this embodiment, dispensing system 200 is an autofill dispensing system. That is, dispensing system 200 is operatively configured to automatically dispense liquid (e.g., water) into container 210 to a predetermined liquid level when container 210 (e.g., an autofill pitcher) is present in the preselected position. In this way, dispensing system 200 provides for hands-free refilling of container 210 for a constant supply of fresh water or other liquid. Dispensing system 200 will be explained in detail below.

Figure 3:
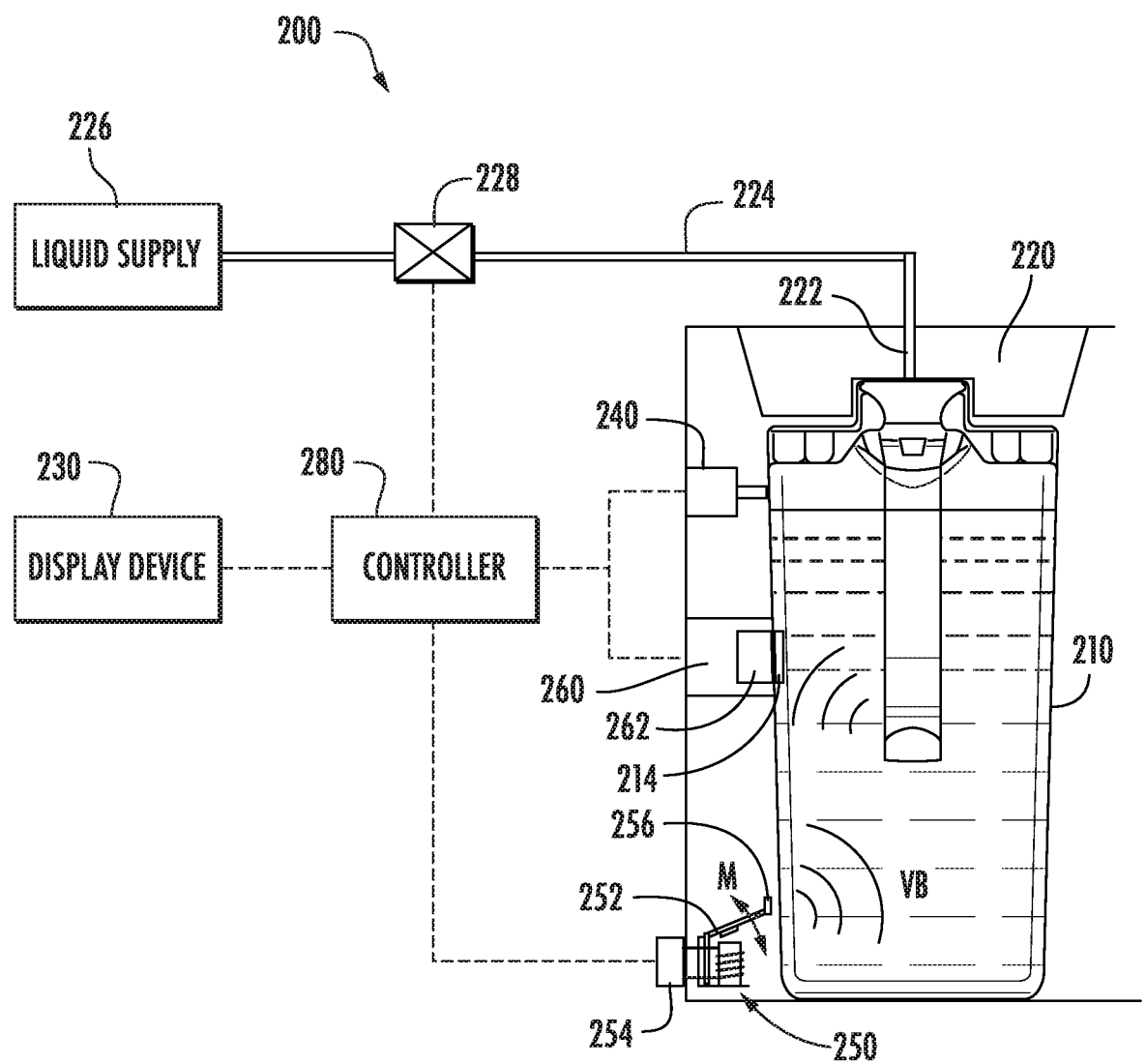
FIG. 3 provides a schematic view of an example dispensing system according to an example embodiment of the present subject matter.

FIG. 3 provides a schematic view of dispensing system 200 according to an example embodiment of the present subject matter. For this embodiment, dispensing system 200 is generally positioned within a chilled chamber, e.g., fresh food chamber 122 of refrigerator appliance 100 of FIGS. 1 and 2. As noted above, generally, dispensing system 200 includes features for dispensing liquid into container 210 (e.g., an autofill pitcher) positioned or present in a preselected position. Further, in accordance with example aspects of the present disclosure, dispensing system 200 includes features for sensing the liquid level within container 210 before, during, or after filling container 210 with liquid by measuring characteristics (e.g., displacement amplitude, time decay of the displacement amplitude over a predetermined period, etc.) of vibrations propagated through container 210. The characteristics can be correlated to a precise volume of liquid contained within container 210, and thus, the liquid level can be determined with high accuracy.

Dispensing system 200 includes various features for delivering or flowing liquid to container 210 when container 210 is present in the preselected position as shown in FIG. 3. Particularly, dispensing system 200 includes a spout 222 for dispensing liquid into container 210 present in the preselected position. For instance, water can flow through spout 222 and into container 210, e.g., to fill container 210 to a desired predetermined liquid level. Spout 222 is positioned within dispenser housing 220 in the depicted embodiment of FIG. 3, but in alternative embodiments, spout 222 need not be positioned within dispenser housing 220. Dispensing system 200 also includes a supply conduit 224 fluidly connecting a liquid supply 226 with spout 222. Liquid supply 226 can be a municipal water line, a filtered water source, or some other suitable supply of liquid. A valve 228 is positioned along supply conduit 224 and is movable between an open position and a closed position. Valve 228 is operable to selectively allow liquid to flow from liquid supply 226 to spout 222. More specifically, when valve 228 is moved to the open position, valve 228 allows the flow of liquid from liquid supply 226 to spout 222 and ultimately container 210. In contrast, when valve 228 is moved to the closed position, valve 228 prevents or prohibits the flow of liquid from liquid supply 226 to spout 222, and thus, no liquid flows into container 210. Valve 228 can be any suitable type of valve. For example, valve 228 can be a solenoid-actuated valve.

Dispensing system 200 also includes various features for detecting the presence of container 210 in the preselected position. For instance, for the depicted embodiment of FIG. 3, dispensing system 200 includes a proximity device 240. Proximity device 240 can be mounted to a sidewall of liner 116 (FIG. 2) beneath dispenser housing 220 along the vertical direction V, for example. Proximity device 240 is operable to detect whether container 210 is present in the preselected position. As will be described in detail below, a controller 280 communicatively coupled with proximity device 240 can receive, from proximity device 240, one or more signals indicating whether container 210 is present in the preselected position. If container 210 is present in the preselected position as determined by controller 280 based on the one or more signals, then controller 280 can perform certain operations to fill container 210 with liquid. If, on the other hand, container 210 is not present in the preselected position as determined by controller 280 based on the one or more signals, then controller 280 can determine not to commence dispensing liquid or can perform certain operations to cease filling container 210 with liquid, e.g., in the event container 210 is removed from the preselected position during a filling cycle or operation. In some embodiments, proximity device 240 can be a proximity switch that can be depressed when container 210 is present in the preselected position or withdrawn when container 210 is not present in the preselected position, for example. In yet other embodiments, proximity device 240 can be a magnetoresistance sensor and can be configured to detect a proximity element (e.g., a magnet) disposed within container 210, e.g., within a lid 212 of container.

Dispensing system 200 includes a vibration generator 250 operable to propagate one or more vibrations through container 210 present in the preselected position. That is, as shown in FIG. 3, when container 210 is present in the preselected position, vibration generator 250 is operatively configured to generate and propagate vibrations VB through container 210. The vibrations VB can propagate through container 210 itself and/or through the fluid medium within container, e.g., liquid, air, or both. For this embodiment, vibration generator 250 has a lever arm 252 that is operable to contact container 210 when container 210 is positioned within the preselected position. More particularly, as shown by the arrow labeled as "M", lever arm 252 is movable between a contact position in which lever arm 252 contacts container 210 when container 210 is in the preselected position and a non-contact position in which lever arm 252 is not in contact with container 210 when container 210 is in the preselected position. Accordingly, lever arm 252 can "tap" container 210 as lever arm 252 moves between the contact position and the non-contact position. Lever arm 252 can be actuated or moved between the contact and non-contact positions by any suitable means. For instance, for this embodiment, lever arm 252 is actuated by a solenoid-motor 254. In some embodiments, lever arm 252 is movable between the contact position and the non-contact position at a fixed predetermined interval. For instance, the lever arm 252 can be moved to the contact position every second, every half second, etc. Further, in some embodiments, to prevent excessive noise and measurement error, lever arm 252 has a rubber element 256 that is operable to contact container 210 when container 210 is present in the preselected position.

In some alternative embodiments, vibration generator 250 can any suitable device operable to propagate one or more vibrations through container 210 present in the preselected position. For instance, in some embodiments, vibration generator 250 can be a mini solenoid actuator, a piezoelectric actuator, a micro flat vibrator, an electrodynamic actuator, an electrohydraulic or servo hydraulic actuator. Further, vibration generator 250 can be driven by suitable driving components, such as e.g., coin motors, mini vibration motors, and/or eccentric shaft motors.

Dispensing system 200 further includes a measurement device 260. Measurement device 260 can be mounted to a sidewall of liner 116 (FIG. 2) beneath dispenser housing 220 along the vertical direction V, for example. Measurement device 260 can be mounted in other suitable locations as well. Measurement device 260 operable to measure one or more characteristics of the one or more vibrations VB propagating through container 210. For this embodiment, measurement device 260 is an accelerometer. However, in alternative embodiments, measurement device 260 can be another suitable type of device capable of detecting and measuring vibrations propagated through container 210, such as e.g., a displacement sensor and/or a proximity sensor. Measurement device 260 can measure the vibrations propagating through container 210 and can route or output one or more signals indicative of the characteristic. For instance, signals from measurement device 260 can be routed to controller 280 for processing and ultimately determining the liquid level of liquid within container 210. Measurement device 260 can output the signals as a voltage, for example. The characteristic or characteristics of the vibrations can be any suitable characteristic of the vibrations that can be used to ultimately determine the liquid level of the liquid within container 210. For instance, characteristic or characteristics can be the amplitude of the vibration, the initial amplitude of the vibration within a predetermined period, the time decay of the amplitude over a predetermined period, some combination thereof, etc.).

In some embodiments, to ensure an accurate reading of the characteristic of the vibrations generated and propagated through container 210 by vibration generator 250, container 210 can be held in contact with measurement device 260. For instance, in some embodiments, measurement device 260 has a magnetic pad 262 and container 210 has a ferromagnetic element 214 (e.g., a magnet). In such embodiments, when 210 container is present in the preselected position, container 210 contacts the measurement device 260 and is held in place thereto by a magnetic force or attraction between the ferromagnetic element 214 of container 210 and the magnetic pad 262 of measurement device 260.

In addition, in some embodiments, measurement device 260 can be utilized to detect whether container 210 is present in the preselected position. Measurement device 260 can be used in conjunction with proximity device 240 to detect whether container 210 is present in the preselected position or alternatively to proximity device 240. Controller 280 communicatively coupled with measurement device 260 can receive, from measurement device 260, one or more signals indicating whether container 210 is present in the preselected position. If container 210 is present in the preselected position as determined by controller 280 based on the one or more signals, then controller 280 can perform certain operations to fill container 210 with liquid. If, on the other hand, container 210 is not present in the preselected position as determined by controller 280 based on the one or more signals, then controller 280 can determine not to commence dispensing liquid or can perform certain operations to cease filling container 210 with liquid, e.g., in the event container 210 is removed from the preselected position during a filling cycle or operation. In some embodiments, controller 280 can command valve 228 to move to the open position to selectively allow liquid to flow from liquid supply 226 to spout 222 so that liquid can flow into container 210 only if the one or more signals received from measurement device 260 and the one or more signals received from proximity device 240 indicate that container 210 is present in the preselected position. This may, for example, provide confidence that container 210 is present in the preselected position prior to dispensing liquid into container 210.

Dispensing system 200 also includes controller 280. Controller 280 can be controller 164 of refrigerator appliance 100 of FIGS. 1 and 2, for example. Additionally or alternatively, controller 280 can be a dedicated computing device of dispensing system 200. Controller 280 can communicatively coupled with valve 228, vibration generator 250, and measurement device 260, and in some embodiments, proximity device 240, a display device 230, and other components of dispensing system 200 or the appliance in which dispensing system 200 is employed. Display device 230 can be display device 166 of refrigerator appliance 100 of FIGS. 1 and 2 or can be a dedicated display of dispensing system 200. Controller 280 can be communicatively coupled with the various components via any suitable wired or wireless communication link.

Generally, controller 280 is operatively configured to control various components of dispensing system 200, e.g., to fill container 210 with liquid. In some embodiments, controller 280 can control dispensing system 200 to autofill container 210 with liquid to a preselected liquid level. The preselected liquid level can be a default setting or a user selected liquid level, for example. Controller 280 can control dispensing system 200 to autofill container 210 to a preselected liquid level in the example manner provided below.

Controller 280 can command, if container 210 is present in the preselected position, valve 228 to move to the open position to allow liquid to flow from liquid supply 226 to spout 222 so that liquid can flow into container 210. To determine whether container 210 is present in the preselected position, controller 280 can receive, from the proximity device 240, one or more signals indicating whether container 210 is present in the preselected position. For instance, in embodiments in which proximity device 240 is a proximity switch, if the switch is depressed by container 210, then proximity device 240 can route one more signals indicating that container 210 is present in the preselected position. If container 210 is in fact present in the preselected position, controller 280 can be configured to command, if the one or more signals indicate that container 210 is present in the preselected position, valve 228 to move to the open position to allow liquid to flow from liquid supply 226 to spout 222 so that liquid can flow into container 210. Moreover, controller 280 can be configured to activate vibration generator 250 to propagate the one or more vibrations through container 210 if the one or more signals indicate that container 210 is present in the preselected position.

In some embodiments, as noted above, measurement device 260 is further operable to detect whether container 210 is present in the preselected position. In such embodiments, controller 280 is further configured to receive, from measurement device 260, one or more signals indicating whether container 210 is present in the preselected position. Further, in some embodiments, controller 280 commands valve 228 to move to the open position to allow liquid to flow from liquid supply 226 to spout 222 so that liquid can flow into container 210 only if the one or more signals received from measurement device 260 and the one or more signals received from proximity device 240 indicate that container 210 is present in the preselected position.

After determining that container 210 is present in the preselected position and valve 228 is moved to the open position to allow liquid to flow into container 210, controller 280 is configured to activate vibration generator 250 to propagate one or more vibrations VB through container 210. That is, during the autofill process in which liquid is dispensed into container 210, vibration generator 250 is activated to generate and propagate vibrations through container 210. For instance, controller 280 can send one or more command signals in the form of electrical pulses to excite solenoid-motor 254 to drive lever arm 252 to move between the contact and non-contact positions. In this way, lever arm 252 can "tap" container 210 at a fixed predetermined interval (e.g., every half second, every second, every two seconds, etc.) to propagate vibrations through container 210. The vibrations generated by vibration generator 250 can propagate through the walls of container 210 and through the fluid medium contained within container 210. Measurement device 260 senses or measures one or more characteristics of the vibrations VB propagating through container 210. Measurement device 260 can route one or more signals indicative of the characteristic of the vibrations VB propagating through container 210 to controller 280.

Controller 280 is configured to receive, from measurement device 260, one or more signals indicative of the characteristic of the one or more vibrations VB propagating through container 210. Controller 280 can then determine a liquid level of liquid within container 210 based at least in part on the one or more signals indicative of the characteristic of the one or more vibrations VB propagating through container 210. For instance, in determining the liquid level of liquid within the container 210 based at least in part on the one or more signals indicative of the characteristic of the one or more vibrations VB propagating through container 210, the controller is configured to correlate the characteristic with a liquid level within container 210. For example, controller 280 can include a database that has a lookup table that correlates one or more characteristics of the detected vibrations with a liquid level of liquid within container 210.

Notably, as liquid fills into container 210 during the dispensing process, the characteristics of the vibrations change. Particularly, vibrations are damped as the liquid level rises in container 210 due to a corresponding increase in stiffness of the container 210 and water. Accordingly, the more full container 210 is with liquid (e.g., water), the more damped the vibrations. In contrast, the less full container 210 is with liquid (e.g., water), the less damped the vibrations. Utilizing this relationship, controller 280 can determine the precise liquid level within container 210 at any point during the autofill dispensing process. Thus, users are offered more flexibility in preprogramming desired liquid fill levels, among other benefits.

With reference now to FIGS. 4 through 9, container 210 is shown progressing through an autofill dispensing process. Particularly, container 210 is shown at three stages of the process and thus three different liquid levels are provided in FIGS. 4, 6, and 8 along with corresponding charts in FIGS. 5, 7, and 9 depicting characteristics of the vibrations through container 210 at the respective liquid levels.

FIG. 4 depicts container 210 filled to a first liquid level, which is about a quarter full in this example. FIG. 5 depicts the characteristics of the detected damped harmonic vibrations through container 210 at the first liquid level shown in FIG. 4. Particularly, FIG. 5 shows the amplitude of the detected vibrations over a first predetermined time period. The time t=0 in FIG. 5 corresponds to a time when lever arm 252 of vibration generator 250 "taps" the side of container 210. Lever arm 252 does not tap container 210 again during the first predetermined time period. As shown, the amplitude of the detected vibrations decays over the first predetermined time period. The detected vibration signal has an initial amplitude $A_{N1}$ (e.g., at t=0), a peak amplitude $A_{P1}$ (which is the same as the initial amplitude $A_{N1}$ in this example, and a final amplitude $A_{F1}$ (e.g., at t=6). The amplitude of the vibration signal over the first predetermined time has a rate of decay $k_1$.

FIG. 6 depicts container 210 filled to a second liquid level, which is about a half full in this example. FIG. 7 depicts the characteristics of the detected damped harmonic vibrations through container 210 at the second liquid level shown in FIG. 6. Specifically, FIG. 7 shows the amplitude of the detected vibrations over a second predetermined time period. The time t=0 in FIG. 7 corresponds to a time when lever arm 252 of vibration generator 250 "taps" the side of container 210. Lever arm 252 does not tap container 210 again during the second predetermined time period. As shown, the amplitude of the detected vibrations decays over the second predetermined time period. The detected vibration signal in FIG. 7 has an initial amplitude $A_{N2}$ (e.g., at t=0), a peak amplitude $A_{P2}$ (which is the same as the initial amplitude $A_{N2}$ in this example, and a final amplitude $A_{F2}$ (e.g., at t=6). The amplitude of the vibration signal over the second predetermined time has a rate of decay $k_2$.

FIG. 8 depicts container 210 filled to a third liquid level, which is nearly full with liquid to a liquid level threshold. FIG. 9 depicts the characteristics of the detected vibrations through container 210 at the liquid level shown in FIG. 8. Specifically, FIG. 9 shows the amplitude of the detected damped harmonic vibrations over a third predetermined time period. The time t=0 in FIG. 9 corresponds to a time when lever arm 252 of vibration generator 250 "taps" the side of container 210. Lever arm 252 does not tap container 210 again during the third predetermined time period. As shown, the amplitude of the detected vibrations decays over the third predetermined time period. The detected vibration signal in FIG. 9 has an initial amplitude $A_{N3}$ (e.g., at t=0), a peak amplitude $A_{P3}$ (which is the same as the initial amplitude $A_{N3}$ in this example, and a final amplitude $A_{F3}$ (e.g., at t=6). The amplitude of the vibration signal over the third predetermined time has a rate of decay $k_3$.

Notably, the initial amplitudes $A_{N1}$, $A_{N2}$, $A_{N3}$ of the vibration signals at the first, second, and third liquid levels (i.e., the liquid levels of the liquid within container 210 in FIG. 4, FIG. 6, and FIG. 8, respectfully) decrease as the liquid level rises (i.e., as the volume of water increases in container 210). Consequently, the peak amplitudes $A_{P1}$, $A_{P2}$, $A_{P3}$ of the vibration signals at the first, second, and third liquid levels decrease as the liquid level rises within container 210. Thus, $A_{N1} > A_{N2} > A_{N3}$ and $A_{P1} > A_{P2} > A_{P3}$. Moreover, the final amplitudes $A_{F1}$, $A_{F2}$, $A_{F3}$ of the vibration signals at the first, second, and third liquid levels decrease as the liquid level rises within container 210. Accordingly, $A_{F1} > A_{F2} > A_{F3}$. In addition, the rate of decay of the amplitude over the predetermined time period decreases as the liquid level rises within container 210. That is, the rate of decay $k_1$ of the amplitude over the first predetermined time period is greater than the rate of decay $k_2$ of the amplitude over the second predetermined time period and the rate of decay $k_2$ of the amplitude over the second predetermined time period is greater than the rate of decay $k_3$ of the amplitude over the third predetermined time period. Stated mathematically, $k_1 > k_2 > k_3$.

As noted above, controller 280 can determine the liquid level of the liquid within container 210 based at least in part on one or more received signals indicative of the characteristic of the vibrations VB propagating through container 210. For instance, controller 280 can correlate one or more characteristics of the vibration signals with a liquid level. In some embodiments, for example, controller 280 can correlate the final amplitude of a damped harmonic vibration signal within a predetermined time period with a liquid level. For instance, to determine the liquid level of the liquid within container 210 shown in FIG. 4, the final amplitude $A_{F1}$ of the vibration signal can be correlated with a liquid level or a volume of water that corresponds with a particular liquid level. As depicted, the final amplitude $A_{F1}$ of the vibration signal for the first predetermined time period correlates to a volume of water of 150 mL in this example. Thus, the liquid level of the liquid within container 210 is known for the first liquid level. To determine the liquid level of the liquid within container 210 shown in FIG. 6, the final amplitude $A_{F2}$ of the vibration signal can be correlated with a liquid level or a volume of water that corresponds with a particular liquid level. As depicted, the final amplitude $A_{F2}$ of the vibration signal for the second predetermined time period correlates to a volume of water of 300 mL in this example. Thus, the liquid level of the liquid within container 210 is known for the second liquid level. To determine the liquid level of the liquid within container 210 shown in FIG. 8, the final amplitude $A_{F3}$ of the vibration signal can be correlated with a liquid level or a volume of water that corresponds with a particular liquid level. As depicted, the final amplitude $A_{F3}$ of the vibration signal for the third predetermined time period correlates to a volume of water of 450 mL in this example. Thus, the liquid level of the liquid within container 210 is known for the third liquid level. Calculations can be made for each predetermined time period as liquid fills into container 210. In this way, the precise liquid level of the liquid within container 210 can be known through the dispensing process. Accordingly, as one benefit, the liquid level can be presented to a user via display device 230 or some other user interface as liquid fills into container 210.

Other characteristics of the detected damped harmonic vibration signals can be utilized to determine the liquid level of the liquid within container 210. For instance, in some embodiments, controller 280 can correlate the peak amplitude of a damped harmonic vibration signal within a predetermined time period with a liquid level. In yet other embodiments, controller 280 can correlate the initial amplitude of a damped harmonic vibration signal within a predetermined time period with a liquid level. In yet other embodiments, controller 280 can correlate the rate of decay of the amplitude of a damped harmonic vibration signal within a predetermined time period with a liquid level. In yet other embodiments, a change in amplitude over the predetermined time period can be utilized to determine the liquid level. For instance, the final amplitude can be subtracted from the initial amplitude to yield a change in amplitude over a particular predetermined time period. In addition, in some embodiments, multiple characteristics can be utilized to determine the liquid level of the liquid within container 210. For instance, the peak amplitude and rate of decay of the amplitude over a predetermined time period can be utilized to determine the liquid level.

Returning to FIG. 3, as liquid fills into container 210 during an autofill dispensing process, the liquid level of liquid within container 210 can be monitored such that liquid can be dispensed into container 210 to a preselected liquid level. Accordingly, a liquid level threshold can be set, e.g., by a user or as a default setting, to correspond to the preselected liquid level. Thus, controller 280 can be configured to ascertain whether liquid within the container 210 exceeds a liquid level threshold based at least in part on the determined liquid level. If the liquid level of the liquid within container 210 exceeds the liquid level threshold, controller 280 is further configured to command valve 228 to move to the closed position so that liquid ceases flowing from liquid supply 226 to the container 210. If, on the other hand, the liquid level of the liquid within container 210 has not exceeded the liquid level threshold, controller 280 controls dispensing system 200 to continue dispensing liquid into container 210 until the liquid level exceeds the liquid level threshold. In addition, if the liquid level of the liquid within container 210 exceeds the liquid level threshold, controller 280 is also configured to deactivate vibration generator 250 such that vibration generator 250 ceases propagating the one or more vibrations through container 210.

Controller 280 can initialize the dispensing process in a number of suitable ways. For instance, in some embodiments, controller 280 communicatively coupled with display device 230 can cause display device 230 to present a prompt to a user to initiate a dispense cycle. For example, display device 230 can present the following prompt: "Initiate Autofill Dispense?" and "Yes" and "No" buttons or icons can be presented on display device 230 as well. A user may select one or more input selectors 162 (FIG. 2) or apply a touch input to display device 230 to select "Yes" or "No." In such embodiments, if the user provides a user input in response to the prompt (e.g., if a user selects "Yes"), controller 280 can command, if container 210 is present in the preselected position, valve 228 to move to the open position to allow liquid to flow from liquid supply 226 to spout 222 so that liquid can flow into container 210 and activates vibration generator 250 to propagate the one or more vibrations VB through container 210.

In other example embodiments, dispensing system 200 can perform an initializing process to check the liquid level within container 210 prior to flowing liquid into container 210. Particularly, prior to commanding valve 228 to move to the open position to allow liquid to flow from liquid supply 226 to spout 222 so that liquid can flow into container 210 and once container 210 is present in the preselected position (e.g., beneath dispenser housing 220), controller 280 is configured to activate vibration generator 250 to propagate one or more initializing vibrations through container 210. For instance, controller 280 can send one or more command signals in the form of electrical pulses to excite solenoid-motor 254 to drive lever arm 252 to move between the contact and non-contact positions. In this way, lever arm 252 can "tap" container 210 at a fixed predetermined interval. Measurement device 260 senses or measures one or more characteristics of the initializing vibrations propagating through container 210. Measurement device 260 can route one or more signals indicative of the characteristic of the initializing vibrations propagating through container 210 to controller 280. Controller 280 can receive from measurement device 260, one or more signals indicative of a characteristic of the one or more initializing vibrations propagating through container 210.

Controller 280 can then determine an initial liquid level of liquid within container 210 based at least in part on the one or more signals indicative of the characteristic of the one or more initializing vibrations propagating through container 210. For instance, controller 280 can correlate the characteristic of the one or more initializing vibrations with a liquid level within container 210. For example, controller 280 can utilize a lookup table that correlates one or more characteristics of the detected initializing vibrations with a liquid level of liquid within container 210. Controller 280 is further configured to ascertain whether the determined initial liquid level exceeds an initial liquid level threshold. If the determined initial liquid level does not exceed the initial liquid level threshold, controller 280 can command valve 228 to the open position and the dispense cycle can proceed as described above. On the other hand, if the determined initial liquid level exceeds the initial liquid level threshold, controller 280 determines that container 210 is already filled with liquid to or past the desired preselected fill level, and accordingly, controller 280 does not command valve 228 to the open position. In some embodiments, controller 280 can cause display device 230 to display a notification indicating that container 210 is already filled with liquid.

Figure 10:
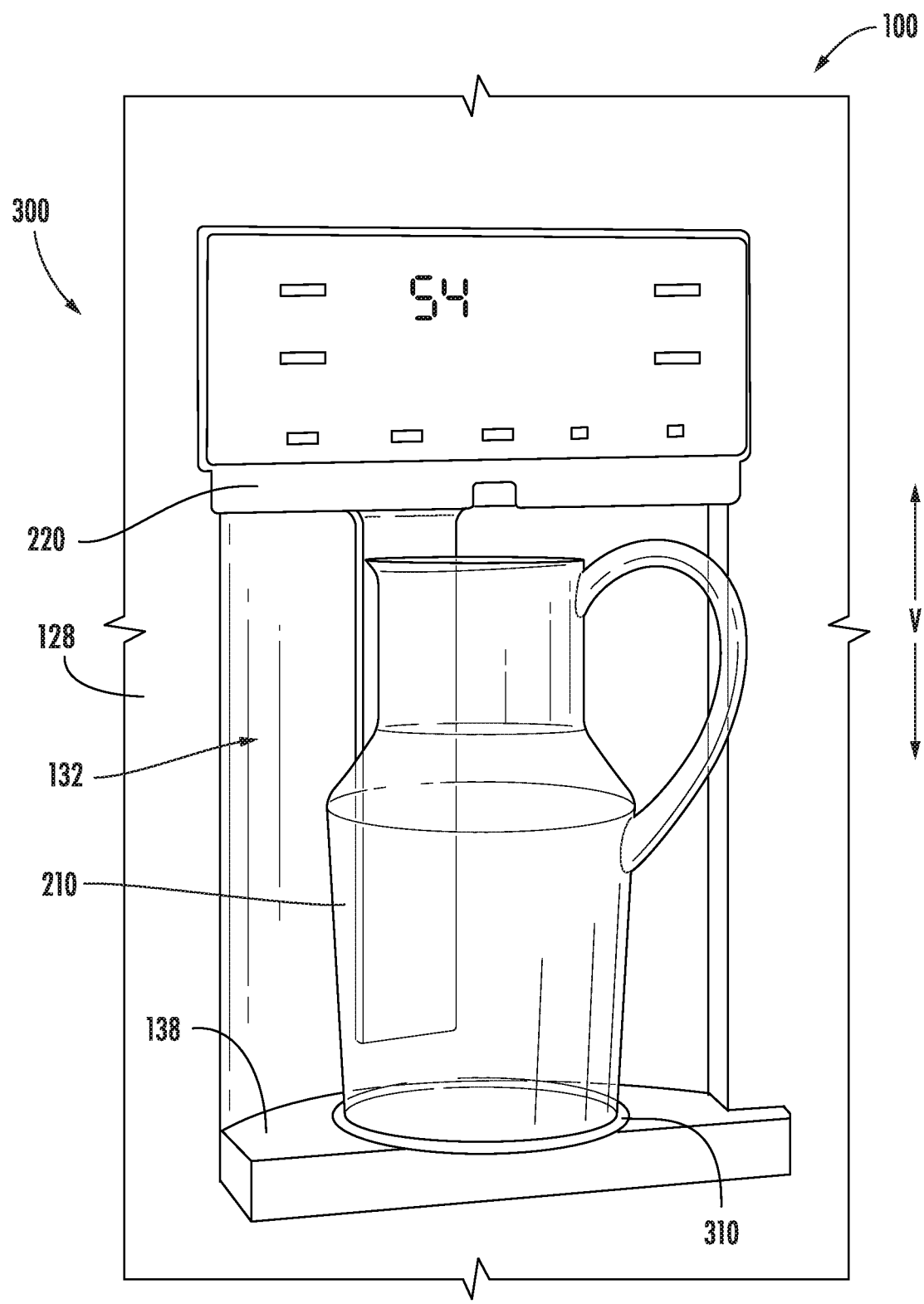
FIG. 10 provides a schematic view of an example dispensing system according to an example embodiment of the present subject matter.

FIG. 10 provides a perspective view of a dispensing system 300 according to an example embodiment of the present disclosure. Dispensing system 300 includes many of the same features of the dispensing system 200 provided herein and can function in a similar manner. As will be explained in detail below, dispensing system 300 can include other features as well. In some embodiments, dispensing system 300 can be an autofill dispensing system.

As shown, for the depicted embodiment of FIG. 10, a recess 132 is defined along an exterior surface of refrigerator door 128 such that a user may access recess 132 from an exterior of refrigerator appliance 100. Container 210 can be positioned within recess 132 so that it may be filled with liquid as described above. That is, liquid can flow from a liquid supply along a supply conduit to a spout or discharging outlet located in dispenser housing 220. A valve can be positioned along the supply conduit and is movable between an open position and a closed position. The valve is operable to selectively allow liquid to flow from the liquid supply to the spout. When container 210 is present in the preselected position, e.g., beneath the dispenser housing 220 along the vertical direction V, controller 280 can command the valve to move to the open position. In this way, liquid can flow from the liquid supply to container 210 along the supply conduit.

Figure 11:
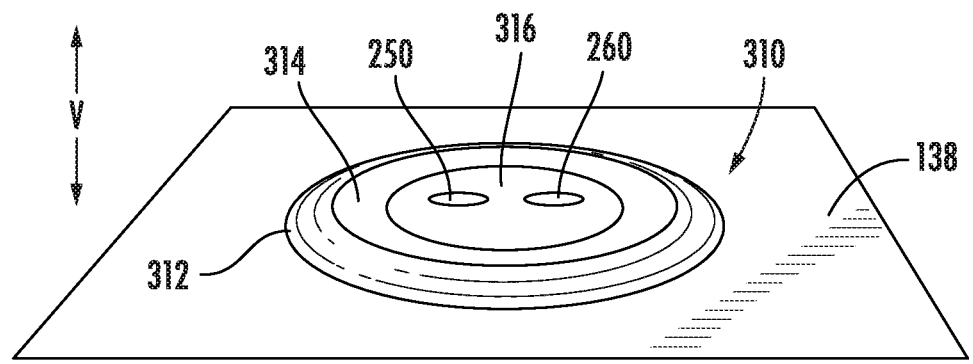
FIG. 11 provides a schematic view of an example pad of the dispensing system of FIG. 10.

When container 210 is present in the preselected position as shown in FIG. 10, container 210 is placed on a pad 310 positioned on a shelf 138 that at least partially defines recess 132. As shown best in FIG. 11, for this embodiment, pad 310 is a rubber-based pad. Pad 310 has an outer bevel 312, and inner bevel 314 that slopes downward towards the center of pad 310, and a compressible base surface 316. Base surface 316 is generally horizontal, i.e., a direction orthogonal to the vertical direction V. As depicted, pad 310 houses or contains vibration generator 250 and measurement device 260. For this embodiment, vibration generator 250 is an actuator operable to propagate vibrations through container 210 and measurement device 260 is an accelerometer operable to detect or measure one or more characteristics of the vibrations propagating through container 210. When base surface 316 is in its resting state (FIG. 11), vibration generator 250 and measurement device 260 are slightly recessed relative to base surface 316 along the vertical direction V. Further, in some embodiments, pad 310 can contain a power source 320 for generating electrical power that can be delivered to vibration generator 250, e.g., so that vibration generator 250 can generate vibrations.

Figure 12:
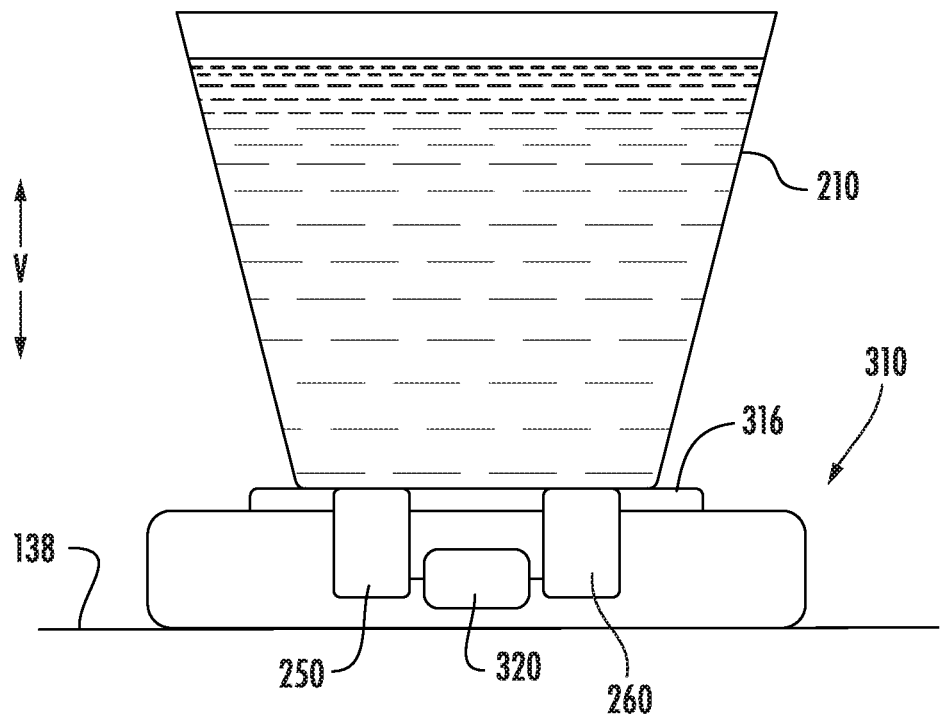
FIG. 12 provides a schematic view of an autofill container positioned on the pad of FIG. 11.

When container 210 is placed on pad 310 in the preselected position as shown in FIG. 12, container 210 compresses base surface 316 of pad 310 and presses against or engages vibration generator 250 and measurement device 260. That is, the bottom surface of container 210 contacts vibration generator 250 and measurement device 260. As liquid fills into container 210, vibration generator 250 propagates vibrations through container 210 and measurement device 260 measures or senses one or more characteristics of the vibrations propagating through container 210. A controller can then determine a liquid level of liquid within container 210, e.g., in a manner described above. Advantageously, in such embodiments as the load increases (i.e., as the volume of liquid increases in container 210), the accuracy of the determined liquid level and improve as container 210 becomes firmly attached to pad 310. Furthermore, although pad 310 is shown positioned on shelf 138 at least partially defines recess 132 of refrigerator door 128, it will be appreciated that pad 310 can also be placed on one of shelves 136 (FIG. 2) of refrigerator appliance 100 or in another suitable location.

Figure 13:
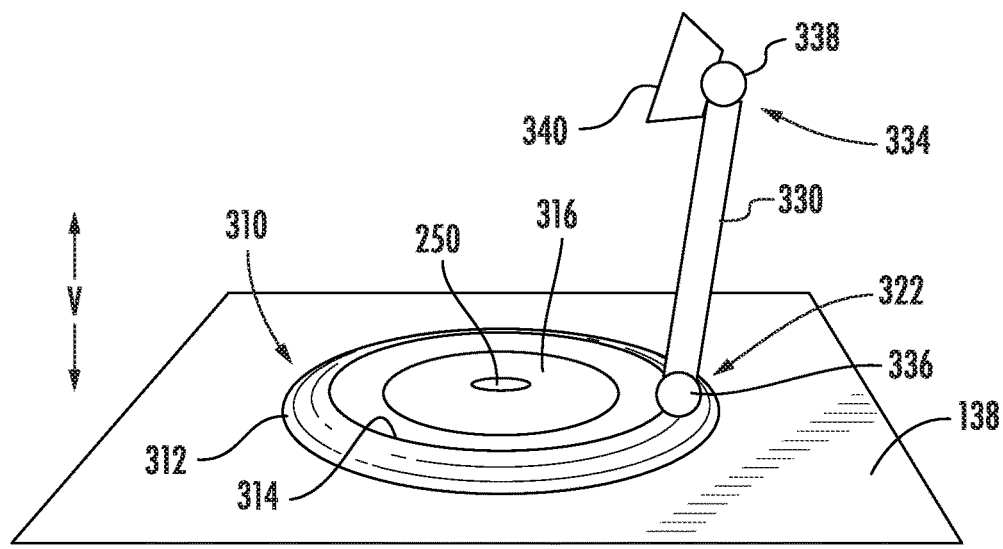
FIG. 13 provides a schematic view of another example pad that can be employed with the dispensing system of FIG. 10.
Figure 14:
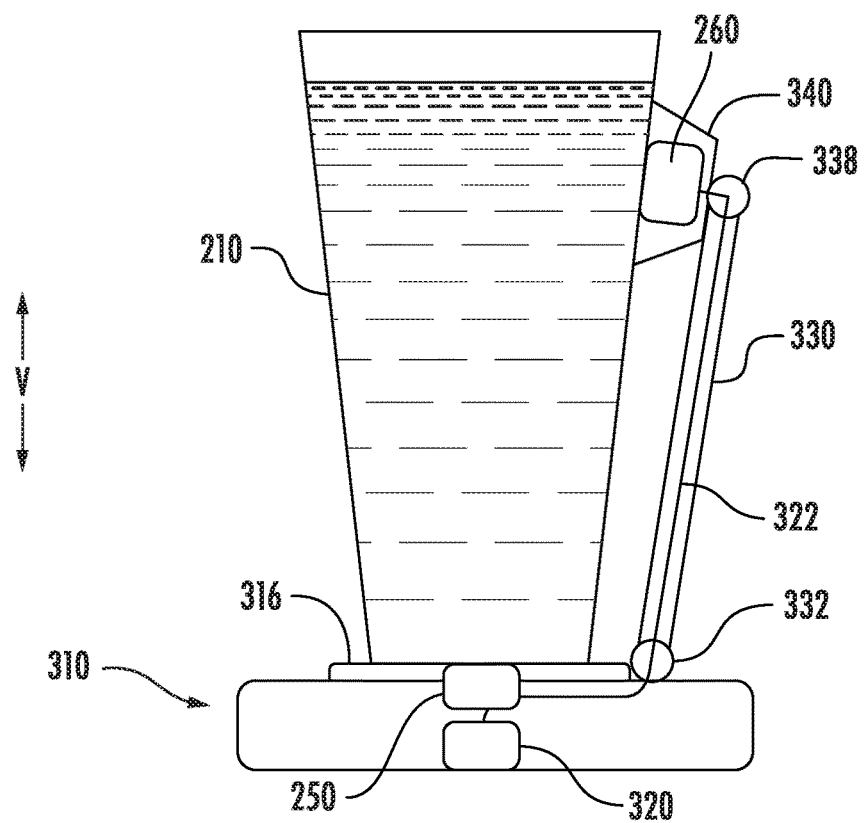
FIG. 14 provides a schematic view of an autofill container positioned on the pad of FIG. 13.

With reference now to FIGS. 13 and 14, FIG. 13 provides a schematic view of another example pad 310 that can be employed with the dispensing system 300 of FIG. 10 and FIG. 14 provides a schematic view of container 210 positioned on the pad 310 of FIG. 13. As shown, pad 310 houses or contains vibration generator 250 and power source 320. Vibration generator 250 is centered on base surface 316 of pad 310 and is electrically coupled with power source 320. For this embodiment, vibration generator 250 is an actuator operable to propagate vibrations through container 210. Dispensing system 300 of FIGS. 13 and 14 also includes a height-adjustable arm 330 operatively coupled to pad 310 by a spring-loaded hinge 336 at its proximal end 332. Spring-loaded hinge 336 allows arm 330 to move relative to pad 310. At a distal end 334 of arm 330, a vacuum cup 340 is operatively coupled to arm 330 by a spring-loaded hinge 338. Spring-loaded hinge 338 allows vacuum cup 340 to move relative to arm 330. Measurement device 260 is positioned within vacuum cup 340 and is electrically coupled with power source 320 (e.g., via an electrical harness 322) and controller 280 (not depicted in FIGS. 13 and 14). For this embodiment, measurement device 260 is an accelerometer and is operable to detect or measure one or more characteristics of the vibrations propagating through container 210.

When container 210 is placed on pad 310 in the preselected position, container 210, vacuum cup 340 can be pressed against container 210 such that measurement device 260 engages or contacts container 210 as shown in FIG. 14. As liquid fills into container 210, vibration generator 250 propagates vibrations through container 210 and measurement device 260 measures or senses one or more characteristics of the vibrations propagating through container 210. A controller can then determine a liquid level of liquid within container 210, e.g., in a manner described above. Advantageously, height-adjustable arm 330 and adjustable vacuum cup 340 can provide a means for detecting the liquid level of the liquid within many different types and shapes of autofill containers.

Figure 15:
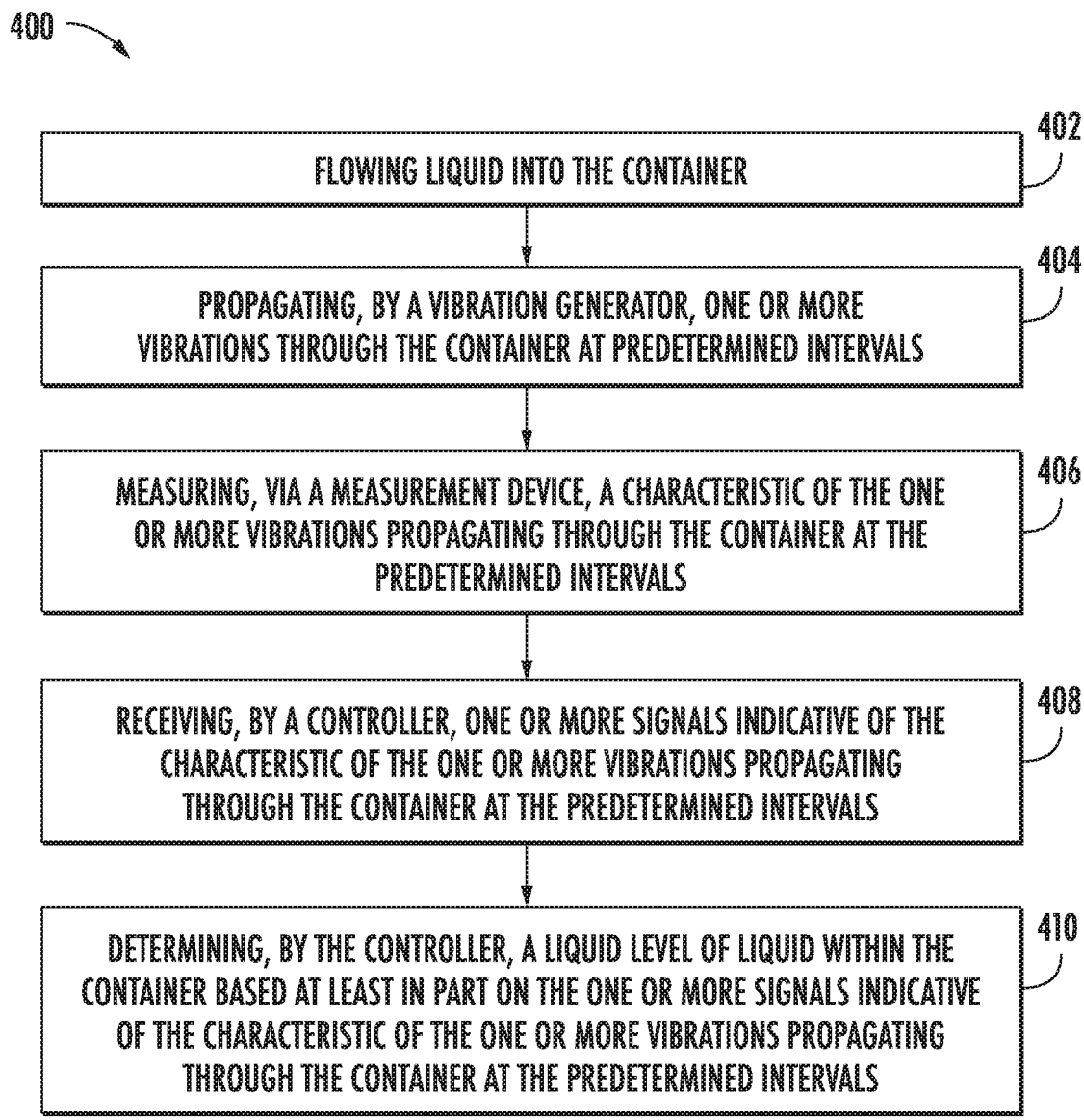
FIG. 15 provides a flow diagram of an exemplary method for dispensing liquid into a container according to an example embodiment of the present subject matter.

FIG. 15 provides a flow diagram of an example method (400) for dispensing liquid into a container according to an example embodiment of the present subject matter. For instance, dispensing system 200 provided herein can be utilized to implement method (400). Accordingly, to provide context to method (400), the numerals used to denote various features of dispensing system 200 will be utilized below. However, in other implementations, dispensing system 300 can be utilized to implement method (400). Method (400) can be utilized to autofill a container, such as e.g., an autofill pitcher. The example dispensing method (400) described below provides one example manner in which a dispensing system can dispense liquid into a container, however, the description below is not intended to be limiting.

At (402), method (400) includes flowing liquid into a container. For instance, once container 210 is detected as present in the preselected position, e.g., beneath dispenser housing 220, controller 280 can command valve 228 to move to the open position. In this way, liquid can flow from liquid supply 226 to container 210 along supply conduit 224.

At (404), method (400) includes propagating, by a vibration generator, one or more vibrations through the container at predetermined intervals. For instance, the vibration generator can be vibration generator 250. Controller 280 can activate vibration generator 250 to propagate one or more vibrations through container 210. For instance, controller 280 can send one or more command signals in the form of electrical pulses to excite solenoid-motor 254 to drive lever arm 252 to move between the contact and non-contact positions. In this way, lever arm 252 can "tap" container 210 at a fixed predetermined interval, e.g., every tenth of a second, every half second, every second, etc. The tapping of the side of container 210 can send or propagate vibrations through the walls of container 210 and the fluid medium within container 210, e.g., liquid, air, a combination thereof, etc.

At (406), method (400) includes measuring, via a measurement device, a characteristic of the one or more vibrations propagating through the container at the predetermined intervals. Measurement device 260 can sense or measure one or more characteristics of the vibrations propagating through container 210. Measurement device 260 can route one or more signals indicative of the characteristic of the vibrations propagating through container 210 to controller 280. Measurement device 260 can output the signals as an output voltage, for example. The characteristic can be associated with an amplitude of the vibrations propagated through container 210, the rate of decay of the amplitude over a predetermined period, or some other suitable characteristic of the vibrations.

At (408), method (400) includes receiving, by a controller, one or more signals indicative of the characteristic of the one or more vibrations propagating through the container at the predetermined intervals. For instance, controller 280 can receive the one or more signals indicative of the characteristic of the one or more vibrations propagating through the container at the predetermined intervals.

At (410), method (400) includes determining, by the controller, a liquid level of liquid within the container based at least in part on the one or more signals indicative of the characteristic of the one or more vibrations propagating through the container at the predetermined intervals. Controller 280 can determine the liquid level of the liquid within container 210 based at least in part on the one or more signals indicative of the characteristic of the one or more vibrations propagating through container 210. For instance, controller 280 can correlate the characteristic of the one or more vibrations with a liquid level within container 210. For example, controller 280 can utilize a lookup table that correlates one or more characteristics of the detected damped harmonic vibrations with a liquid level of the liquid within container 210. For instance, a peak amplitude of a vibration signal over a predetermined time can be correlated to a liquid level of the liquid within container 210. In some implementations, controller 280 can cause display device 230 to show, in real time, the liquid level or volume of liquid within container 210 as container 210 is filled with liquid.

In some implementations, the method (400) further includes ascertaining, by the controller, whether the determined liquid level exceeds a liquid level threshold. For instance, once controller 280 determines the liquid level of the liquid within container 210, controller 280 can check the determined liquid level against the liquid level threshold. The liquid level threshold can correspond with a preselected fill level. If the determined liquid level does not exceed the liquid level threshold, controller 280 continues controlling various components of dispensing system 200 to proceed with the dispense cycle (e.g., controller 280 causes valve 228 to remain open). On the other hand, if the determined liquid level exceeds the liquid level threshold, controller 280 determines that container 210 has been filled with liquid to the desired preselected fill level, and accordingly, controller 280 commands valve 228 to move to the closed position. Thus, liquid ceases flowing from liquid supply 226 to container 210. In some embodiments, controller 280 can cause display device 230 to display a notification indicating that container 210 has been filled with liquid to the preselected fill level.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A refrigerator appliance, comprising:
   a cabinet defining a chilled chamber;

a dispensing system positioned within the chilled chamber, the dispensing system comprising:
a vibration generator operable to propagate one or more vibrations through a container operable to contain liquid, wherein the vibration generator has a lever arm that is operable to contact the container when the container is positioned in a preselected position;
a measurement device operable to measure a characteristic of the one or more vibrations propagating through the container; and
a controller communicatively coupled with the vibration generator and the measurement device, the controller configured to:
receive, from the measurement device, one or more signals indicative of the characteristic of the one or more vibrations propagating through the container; and
determine a liquid level of liquid within the container based at least in part on the one or more signals indicative of the characteristic of the one or more vibrations propagating through the container.

2. The refrigerator appliance of claim 1, wherein the dispensing system further comprises:
a proximity device for detecting whether the container is present in the preselected position.

3. The refrigerator appliance of claim 1, wherein the dispensing system further comprises:
a spout for dispensing liquid;
a supply conduit fluidly connecting a liquid supply with the spout; and
a valve positioned along the supply conduit and movable between an open position and a closed position, the valve operable to selectively allow liquid to flow from the liquid supply to the spout.

4. The refrigerator appliance of claim 3, wherein the dispensing system further comprises:
a proximity device for detecting whether the container is present in the preselected position, and
wherein the controller is communicatively coupled with the valve and the proximity device, and wherein the controller is configured to:
receive, from the proximity device, one or more signals indicating whether the container is present in the preselected position;
command, if the one or more signals indicate that the container is present in the preselected position, the valve to move to the open position to selectively allow liquid to flow from the liquid supply to the spout so that liquid can flow into the container; and
activate the vibration generator to propagate the one or more vibrations through the container.

5. The refrigerator appliance of claim 4, wherein the measurement device is further operable to detect whether the container is present in a preselected position, and wherein the controller is further configured to:
receive, from the measurement device, one or more signals indicating whether the container is present in the preselected position, and
wherein the controller commands the valve to move to the open position to selectively allow liquid to flow from the liquid supply to the spout so that liquid can flow into the container only if the one or more signals received from the measurement device and the one or more signals received from the proximity device indicate that the container is present in the preselected position.

6. The refrigerator appliance of claim 4, wherein the controller is further configured to:
ascertain whether the determined liquid level exceeds a liquid level threshold.

7. The refrigerator appliance of claim 6, wherein the controller is further configured to:
command the valve to move to the closed position so that liquid ceases flowing from the liquid supply to the container if the determined liquid level exceeds the liquid level threshold.

8. The refrigerator appliance of claim 1, wherein the measurement device has a magnetic pad and the container has a ferromagnetic element, wherein when the container is present in the preselected position, the container contacts the measurement device and is held in place by a magnetic force between the ferromagnetic element of the container and the magnetic pad of the measurement device.

9. The refrigerator appliance of claim 1, wherein the lever arm has a rubber element that is operable to contact the container when the container is present in the preselected position.

10. The refrigerator appliance of claim 1, wherein the characteristic of the one or more vibrations propagating through the container includes at least one of an initial amplitude, a peak amplitude, a final amplitude, and a rate of decay of an amplitude of the one or more vibrations over a predetermined period.

11. A dispensing system for an appliance, the dispensing system comprising:
a spout for dispensing liquid into a container present in a preselected position;
a supply conduit fluidly connecting a liquid supply with the spout;
a valve positioned along the supply conduit and movable between an open position and a closed position, the valve operable to selectively allow liquid to flow from the liquid supply to the spout;
a vibration generator operable to propagate one or more vibrations through the container present in the preselected position, wherein the vibration generator has a lever arm movable between a contact position in which the lever arm contacts the container and a non-contact position in which the lever arm is not in contact with the container;
a measurement device operable to measure a characteristic of the one or more vibrations propagating through the container; and
a controller communicatively coupled with the valve, the vibration generator, and the measurement device, the controller configured to:
command, if the container is present in the preselected position, the valve to move to the open position to allow liquid to flow from the liquid supply to the spout so that liquid can flow into the container;
activate the lever arm of the vibration generator to propagate the one or more vibrations through the container;
receive, from the measurement device, one or more signals indicative of the characteristic of the one or more vibrations propagating through the container; and
determine a liquid level of liquid within the container based at least in part on the one or more signals indicative of the characteristic of the one or more vibrations propagating through the container.

12. The dispensing system of claim 11, wherein, in determining the liquid level of liquid within the container based at least in part on the one or more signals indicative of the characteristic of the one or more vibrations propagating through the container, the controller is configured to:
correlate the characteristic with a liquid level of liquid within the container.

13. The dispensing system of claim 11, wherein the controller configured to:
ascertain whether the determined liquid level exceeds a liquid level threshold;
deactivate, if the determined liquid level exceeds the liquid level threshold, the vibration generator such that the vibration generator ceases propagating the one or more vibrations through the container; and
command, if the determined liquid level exceeds the liquid level threshold, the valve to move to the closed position so that liquid ceases flowing from the liquid supply to the container.

14. The dispensing system of claim 11, further comprising:
a display device communicatively coupled with the controller, and wherein the controller is further configured to:
cause the display device to present a prompt to a user to initiate a dispense cycle, and
wherein, if the user provide a user input in response to the prompt, the controller commands, if the container is present in the preselected position, the valve to move to the open position to allow liquid to flow from the liquid supply to the spout so that liquid can flow into the container and activates the vibration generator to propagate the one or more vibrations through the container.

15. The dispensing system of claim 11, wherein prior to commanding, if the container is present in the preselected position, the valve to move to the open position to allow liquid to flow from the liquid supply to the spout so that liquid can flow into the container, the controller is configured to:
activate the vibration generator to propagate one or more initializing vibrations through the container;
receive, from the measurement device, one or more signals indicative of a characteristic of the one or more initializing vibrations propagating through the container;
determine an initial liquid level of liquid within the container based at least in part on the one or more signals indicative of the characteristic of the one or more initializing vibrations propagating through the container; and
ascertain whether the determined initial liquid level exceeds an initial liquid level threshold, and
wherein if the determined initial liquid level does not exceed the initial liquid level threshold, the controller commands the valve to the open position.

16. The dispensing system of claim 11, wherein the lever arm is movable between the contact position and the non-contact position at a fixed predetermined interval.

17. A method for dispensing liquid into a container, the method comprising:
flowing liquid into the container;
propagating, by causing a lever arm of a vibration generator to contact the container, one or more vibrations through the container at predetermined intervals;
measuring, via a measurement device, a characteristic of the one or more vibrations propagating through the container at the predetermined intervals;
receiving, by a controller, one or more signals indicative of the characteristic of the one or more vibrations propagating through the container at the predetermined intervals;
determining, by the controller, a liquid level of liquid within the container based at least in part on the one or more signals indicative of the characteristic of the one or more vibrations propagating through the container at the predetermined intervals.

18. The method of claim 17, wherein the lever arm has a rubber element that is operable to contact the container when the container is present in the preselected position.

19. The method of claim 17, wherein the predetermined intervals at which the lever arm contacts the container are fixed.

20. The dispensing system of claim 11, wherein the lever arm has a rubber element that is operable to contact the container when the container is present in the preselected position.

* * * * *